US006991466B2

(12) United States Patent
Jewell

(10) Patent No.: US 6,991,466 B2
(45) Date of Patent: Jan. 31, 2006

(54) NOTE BOARD APPARATUS AND KIT

(76) Inventor: Janet Marie Jewell, 3095 W. Cass Ave., Flint, MI (US) 48504-1209

( * ) Notice: Subject to any disclaimer, the term of this patent is extended or adjusted under 35 U.S.C. 154(b) by 0 days.

(21) Appl. No.: 10/707,906

(22) Filed: Jan. 23, 2004

(65) Prior Publication Data

US 2005/0153270 A1 Jul. 14, 2005

Related U.S. Application Data

(60) Provisional application No. 60/442,839, filed on Jan. 27, 2003.

(51) Int. Cl.
*B43L 1/00* (2006.01)

(52) U.S. Cl. .................................................. 434/408
(58) Field of Classification Search ............... 434/408, 434/413, 415, 422, 429, 430; 248/444, 447.2, 248/451
See application file for complete search history.

(56) References Cited

U.S. PATENT DOCUMENTS

| | | | | |
|---|---|---|---|---|
| 3,658,365 A | * | 4/1972 | Greubel | 281/31 |
| 3,756,481 A | * | 9/1973 | Schaefer | 224/275 |
| 4,105,182 A | * | 8/1978 | Jacobson | 248/459 |
| 4,391,053 A | * | 7/1983 | Anthony | 40/735 |
| 4,722,627 A | | 2/1988 | Salacuse | |
| 5,123,676 A | | 6/1992 | Donnelly et al. | |
| 5,174,607 A | * | 12/1992 | Hill | 281/45 |
| 5,224,608 A | | 7/1993 | Paquette | |
| 5,360,342 A | * | 11/1994 | Pardner | 434/84 |
| 5,429,301 A | * | 7/1995 | Franks | 239/1 |
| 5,430,965 A | * | 7/1995 | Lai | 40/597 |
| 5,487,466 A | * | 1/1996 | Robson | 206/214 |
| 5,607,067 A | * | 3/1997 | Morrissey | 211/50 |
| 5,619,774 A | * | 4/1997 | Perry | 24/3.6 |
| 5,628,439 A | | 5/1997 | O'Hara | |
| 5,678,943 A | | 10/1997 | Parsons | |
| 5,775,919 A | * | 7/1998 | Gardner | 434/408 |
| 5,788,093 A | | 8/1998 | Krut | |
| 5,797,630 A | | 8/1998 | Conley, Jr. | |
| 5,823,500 A | * | 10/1998 | La Coste | 248/444 |
| 5,862,240 A | * | 1/1999 | Ohkubo et al. | 381/356 |
| 5,911,441 A | | 6/1999 | Yamamoto et al. | |
| 6,109,656 A | | 8/2000 | Waldron | |
| 6,139,331 A | * | 10/2000 | Owen | 434/408 |
| 6,163,997 A | * | 12/2000 | Deralas | 40/745 |
| 6,170,791 B1 | | 1/2001 | Pitcher et al. | |
| 6,217,074 B1 | | 4/2001 | Conley, Jr. | |
| 6,244,400 B1 | | 6/2001 | Bowers | |
| 6,261,021 B1 | | 7/2001 | Pfanner et al. | |
| 6,299,119 B1 | * | 10/2001 | Dunning | 248/346.03 |
| 6,345,102 B1 | * | 2/2002 | Davis et al. | 381/86 |
| 6,364,362 B1 | | 4/2002 | Severin | |
| 6,453,588 B1 | * | 9/2002 | Lykens | 40/308 |
| 6,607,233 B1 | * | 8/2003 | Beaver et al. | 296/97.9 |
| 6,672,622 B2 | * | 1/2004 | Barron | 281/44 |
| 6,682,352 B2 | * | 1/2004 | Lopez | 434/408 |
| 6,690,912 B1 | * | 2/2004 | Vaughn | 434/308 |
| 6,728,995 B2 | * | 5/2004 | Ainley et al. | 24/3.3 |

* cited by examiner

*Primary Examiner*—Kurt Fernstrom

(57) ABSTRACT

A note board apparatus attachable to an object, such as a book, includes a support board and a base sheet adhesively connected to the support board. At least one edge of a plurality of writing sheets is connected to the base sheet, and a clip element is connected to the support board along an edge thereof and configured to releasably connect the support board to an object. A note taking organizational kit includes at least one note board apparatus having a support board and a notepad assembly, and at least one storage unit. The note board apparatus also includes a clip element connected to the support board configured to releasably connect the note board apparatus to an object. At least one divider sheet may also be included, configured to separate multiple note board apparatuses within the storage unit.

1 Claim, 5 Drawing Sheets

NOTE BOARD APPARATUS AND KIT

CROSS REFERENCE TO RELATED APPLICATIONS

This application claims priority to a provisional patent application Ser. No. 60/442,839 entitled, "Note Board Apparatus and Kit," filed Jan. 27, 2003. The entire disclosure of Ser. No. 60/442,839 is incorporated herein by reference in its entirety.

BACKGROUND OF INVENTION

1. Field of the Invention

The present invention generally relates to a note board apparatus configured for releasable attachment to an object such as a book, and a kit including a storage unit configured to store and organize one or more such note board apparatuses.

2. Background of Related Art

Pads and books, useful for taking notes at events such as seminars, educational classes, meetings and the like, are well known in the art. Notepads may be bound or constructed as a folder having loose pages inserted within. There are also notepads arranged with sections to organize and separate different events within the notepad. Unfortunately, these types of notepads may be difficult to use in situations where there is no writing surface available for the user to rest the notepad during use. During certain events, users may need to hold a book or other object such as a Bible during a Bible study class or seminar, in addition to a notepad. In this setting it would be desirable to attach a notepad to the book (or the Bible as the case may be). This would eliminate the problem of juggling the two items, while at the same time attempting to record and write notes in the notepad.

After notes are recorded in a typical notepad, the user may desire to store and organize the notes to use for later reference. Standard notepads typically lack an adequate means to store and organize them. Thus, there is a desire and need in the art for a notepad that is attachable to an object, such as a book, to aid in note taking activities combined with a need in the art for a storage unit configured to store and organize such notepads.

SUMMARY OF INVENTION

Accordingly, the present invention provides a note board apparatus and note taking organizational kit configured to assist in note taking activities of a user and provide an efficient and organized system of organizing such notes for later reference.

In one embodiment of the present invention, a note board apparatus includes a support board and a notepad assembly attached to the support board. A clip element is connected to the support board along an edge of the support board and is configured to releasably connect the support board to an object.

In another embodiment of the present invention, a note board apparatus includes a support board, a base sheet adhesively connected to the support board and a plurality of writing sheets connected to the base sheet along at least one edge of the plurality of writing sheets. A clip element is connected to the support board along an edge of the support board and is configured to releasably connect the support board to an object.

In yet another embodiment of the present invention, a note taking organizational kit includes at least one note board apparatus including a support board and a notepad assembly attached to the support board. A clip element is connected to the support board along an edge of the support board and is configured to releasably connect the support board to an object. A storage unit is also included that is configured to receive the at least one note board apparatus within its interior.

BRIEF DESCRIPTION OF DRAWINGS

The foregoing features, as well as other features, will become apparent with reference to the description and figures below, in which like numerals represent like elements, and in which.

DETAILED DESCRIPTION

The present invention generally relates to a note board apparatus attachable to an object such as a book combined with a storage unit to store and organize multiple note boards. The present invention also combines the apparatus into a kit, which may include a storage unit and one or more note boards providing an effective organizational tool.

Figure 1:
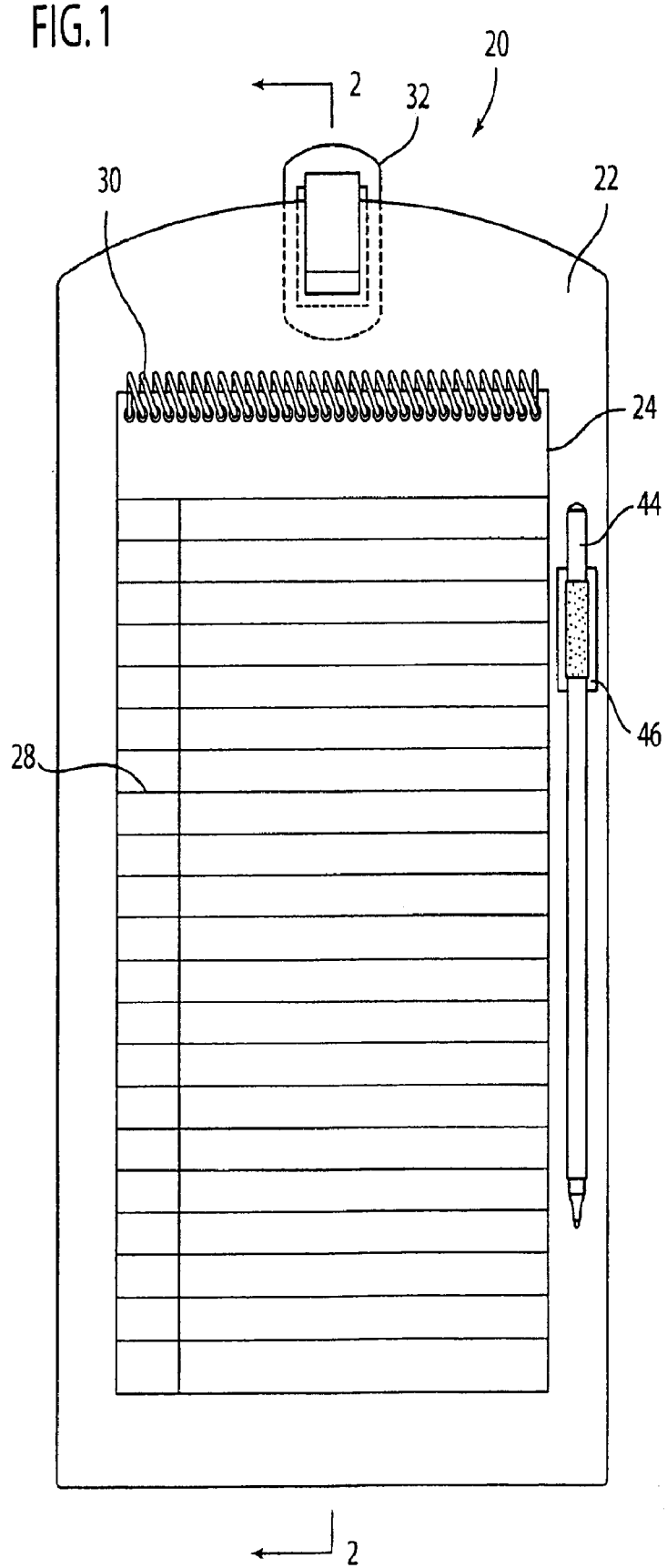
FIG. 1 is a front view of an embodiment of a note board apparatus of the present invention.

Referring to FIG. 1, a note board apparatus 20 may include a support board 22, a notepad assembly 24 and a clip element 32. The notepad assembly 24 may include a back or base sheet 26, one or more pages of note paper or writing sheets 28, and a binding comb 30 or other means known in the art to hold a plurality of pages or sheets of writing paper together. Base sheet 26 and writing sheets 28 may be assembled and held together with binding comb 30. Binding comb 30, as shown in the figures, may be connected to writing sheets 28 and base sheet 26 at a top edge, but may alternatively be held along any other edge of writing sheets 28 and base sheet 26. Binding comb 30 holds writing sheets 28 loosely, such that writing sheets 28 may be turned over by the user to gain access to other sheets within notepad assembly 24. Binding comb 30 may be constructed for a particular size or use, and is also generally available in the art, and may be made of plastic, wire or other suitable material.

Figure 2:
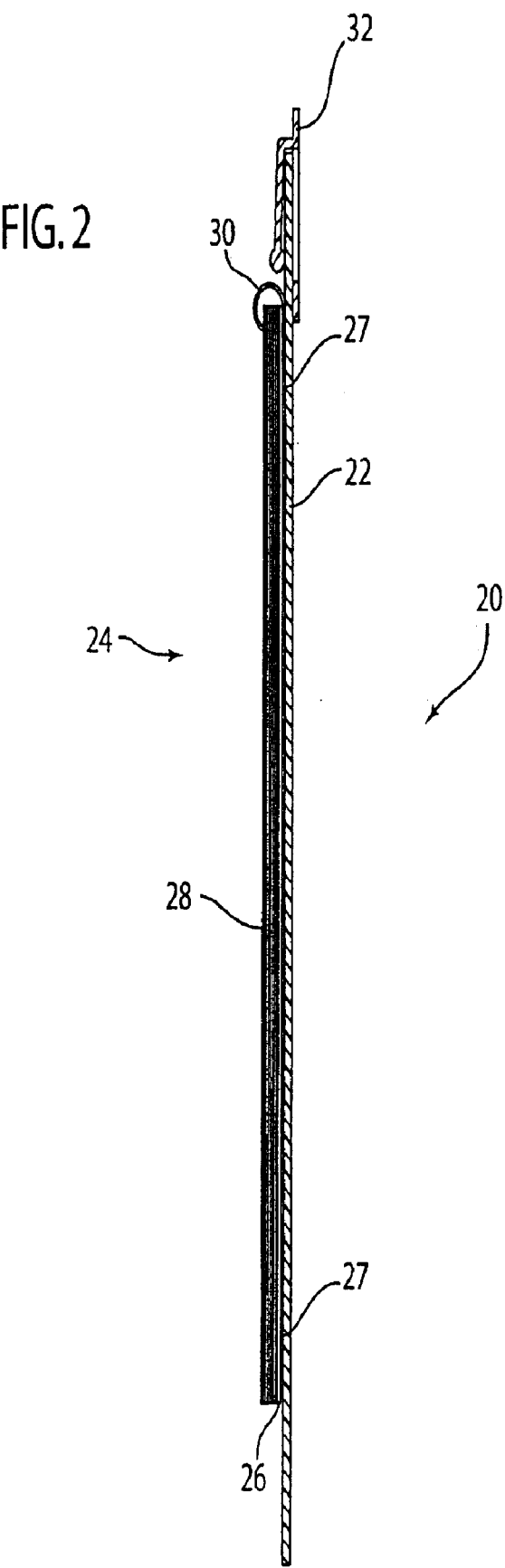
FIG. 2 is a sectional view taken along line 2—2 in FIG. 1.
Figure 4:
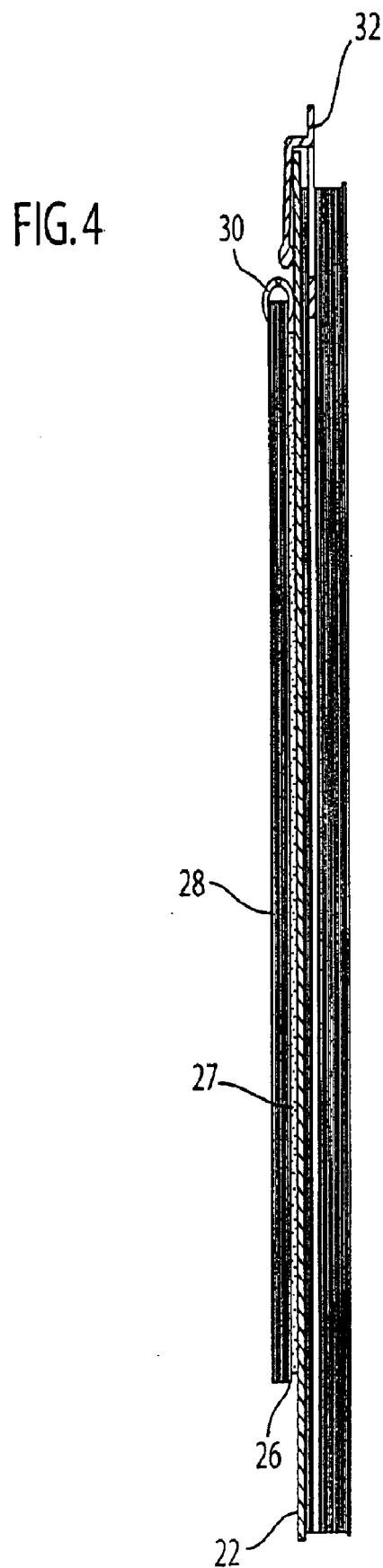
FIG. 4 is a sectional view taken along line 4—4 in FIG. 3.

As shown in FIG. 2, base sheet 26 may be adhesively connected (or otherwise bound) to support board 22 on a bottom surface of base sheet 26 with an adhesive portion 27. Base sheet 26 may be constructed of a heavier weight paper material than writing sheets 28 to aid in securing notepad assembly 24 to support board 22. Writing sheets 28 may also be made of any desired type or weight of paper material typically used for writing and taking notes. The adhesive portion 27 may include one or more adhesive portions 27 as shown in FIG. 2 or may include a full adhesive layer between the back side of base sheet 26 and support board 22 as shown in FIG. 4. Support board 22 as shown, may be constructed of a cardstock material or may alternatively be made of plastic, metal or any other surface rigid enough to support notepad assembly 24. Support board 22 as shown in the figures is substantially flat and rectangular in shape, but may be constructed in any desired shape or size as needed and desired by the user.

Figure 3:
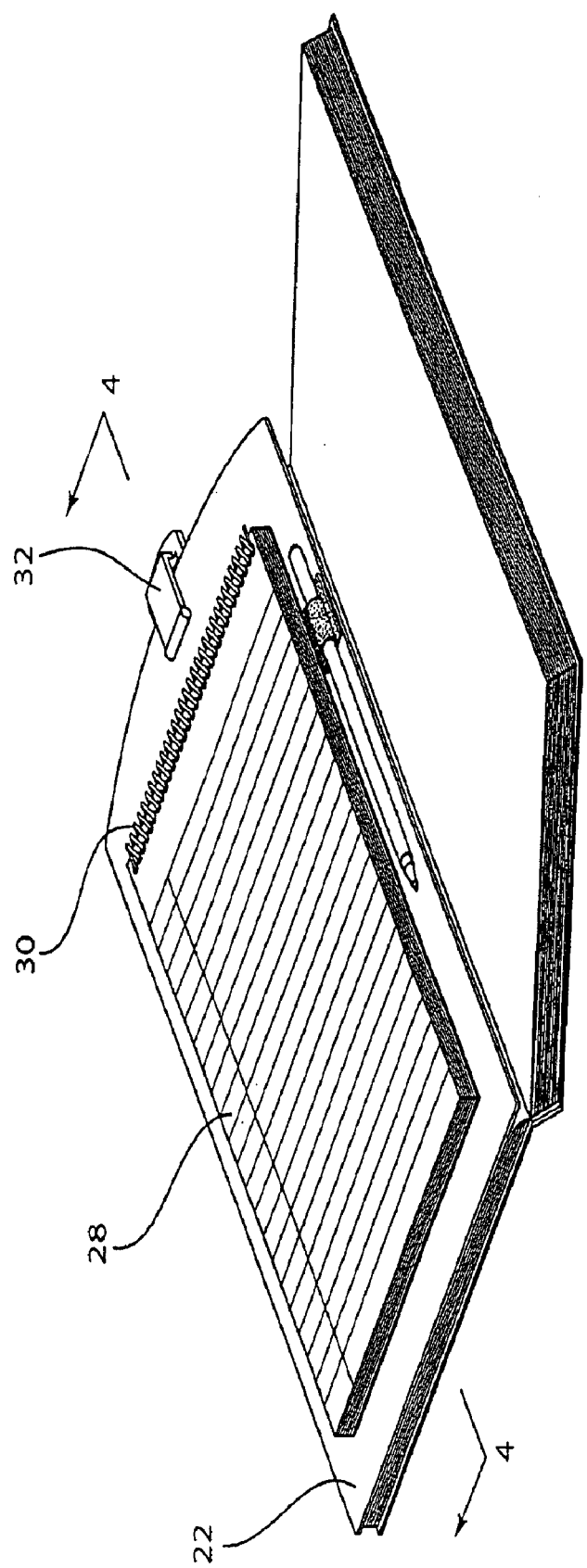
FIG. 3 is a perspective view of an embodiment of the present invention attached to a book.

Clip element 32 may include a conventional clip assembly available in the art, such as the Hot Clip sold under the tradename ACCO. Clip element 32 may be releasably clipped to support board 22 at a top edge of support board 22 as shown in the figures. Alternatively, clip element 32 may be clipped or otherwise releasably connected to any edge of support board 22 to meet the particular need of the user. Clip element 32 may be configured to releasably connect note board apparatus 20 to a book or other surface as shown in FIGS. 3 and 4. As such, support board 22 and a portion of the book or object may be sandwiched within clip element 32, which securely, but releasably, hold note board apparatus 20 to the book or other object.

Note board apparatus 20 may optionally include one or more writing instruments 44, such as a pen or pencil that may be releasably attached to support board 22 with a hook and loop connection 46, such as VELCRO as shown in FIG. 1. Alternatively, writing instrument 44 may include a hook feature designed integral with writing instrument 44 that allows writing instrument 44 to be hung on an edge of support board 22.

Figure 5:
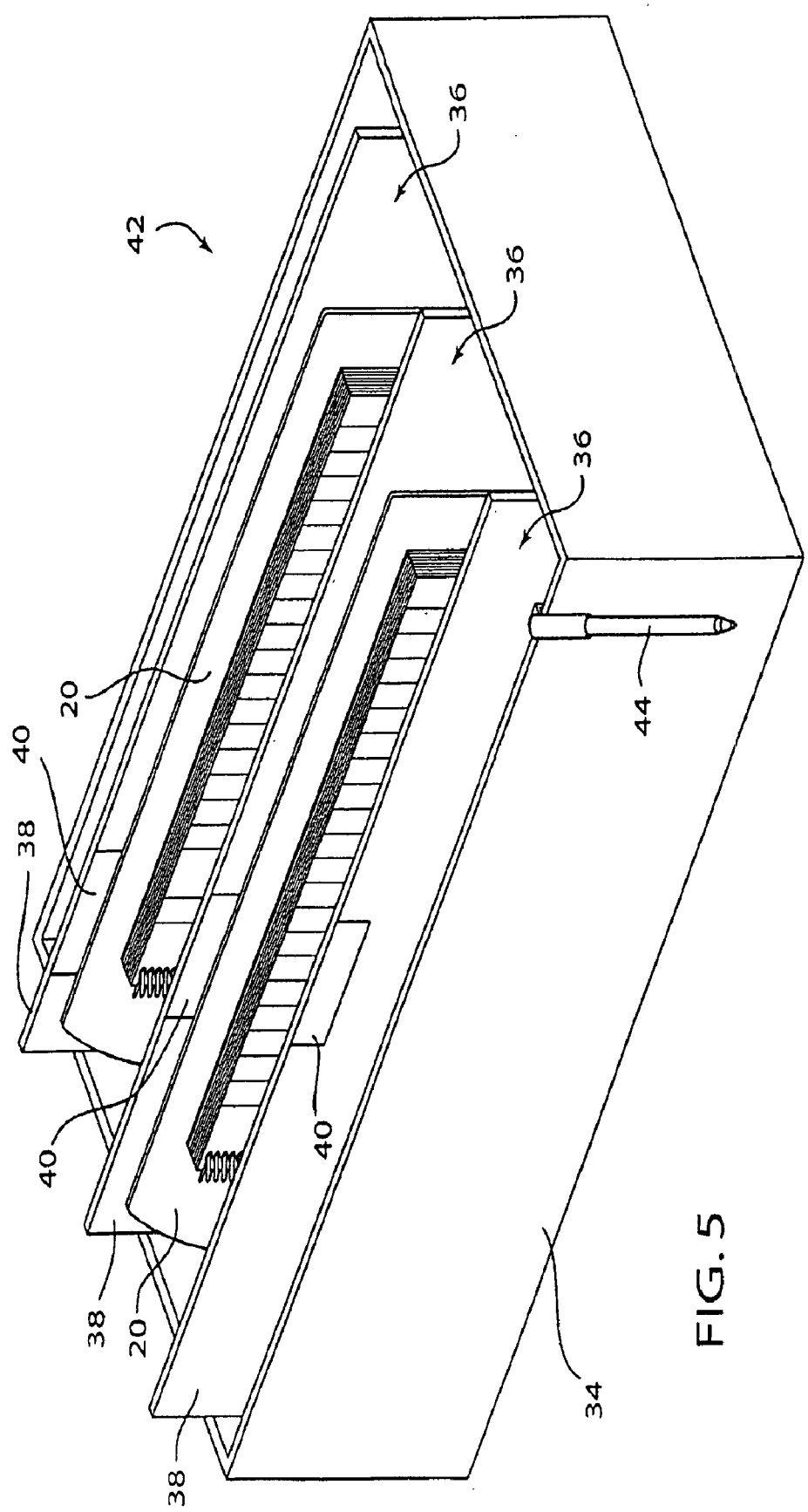
FIG. 5 is a perspective view of a storage unit of the present invention.

As illustrated in FIG. 5, a storage unit 34 may also be included and used for storing one or more note boards 20 for later reference and use. Storage unit 34 may be constructed of corrugated cardboard material, as with a conventional cardboard box, or any other suitable material such as plastic or metal and assembled in the form and shape of a typical box. Storage unit 34 may optionally include one or more divider elements 36 that may be positioned between two or more note boards 20 to efficiently separate and organize note boards 20 within storage unit 34. Divider element 36 may be constructed of paper, cardboard, plastic, metal or any other material that provides the desired function of separating the note boards 20 within storage unit 34.

As illustrated in FIG. 5, divider elements 36 may be substantially flat and rectangular shaped and configured to be received within an interior of a particular shaped storage unit 34. Divider elements 36 may be configured in any desired shape to correspond to the particular shape of note boards 20 and storage unit 34. Divider element 36 may also include an upwardly extending portion 38 that extends above a top edge of storage unit 34. A label 40 may be placed on divider element 36 at any location. For example, label 40 may be placed on upwardly extending portion 38 so as to be in a visible location above the top edge of storage unit 34. This further assists the user in organizing the note boards 20 that have been placed within the interior of storage unit 34. Label 40 may be adhesively attached to divider element 36 or may be a clip-on type of file label. A kit 42 of the present invention may include at least one storage unit 34 and at least one note board 20. The kit 42 may include any combination of sizes and quantities of note boards 20 and storage units 34. The kit may optionally include one or more divider element 36 and one or more writing instrument 44. Writing instrument 44 may be releasably connected to support board 22 as shown in FIG. 1 or alternatively may be releasably connected to storage unit 34 as shown in FIG. 5. FIG. 5 illustrates a writing instrument 44 having an integral hook to allow it to be conveniently and releasably attached to storage unit 34. Writing instrument 44 may optionally be releasably connected to storage unit 34 with a hook and loop connection 46 such as the connection shown in FIG. 1, or by other means known in the art.

While the invention has been described in conjunction with specific embodiments, it is evident that many alternatives, modifications and variations will be apparent to those skilled in the art in light of the foregoing description. Accordingly, the present invention attempts to embrace all such alternatives, modifications and variations that fall within the spirit and scope of the appended claims.

What is claimed is:

1. A note taking organizational kit, comprising:

at least one note board apparatus including a support board, a notepad assembly attached to said support board, and a clip element connected to said support board along an edge of said support board, said clip element configured to releasably connect said support board to an object;

at least one storage unit configured to receive said at least one note board apparatus within its interior;

at least one divider received within said storage unit, said at least one divider configured to separate said at least two note board apparatus; and wherein said at least one divider includes an extended edge that extends upwardly above a top edge of said storage unit and a label connected to said extended edge.

* * * * *